(12) United States Patent
Grotkowski et al.

(10) Patent No.: US 8,547,024 B2
(45) Date of Patent: *Oct. 1, 2013

(54) EFFICIENT ELECTRICALLY-ISOLATED POWER CIRCUITS WITH APPLICATION TO LIGHT SOURCES

(71) Applicant: Light-Based Technologies Incorporated, Vancouver (CA)

(72) Inventors: Miroslaw Marek Grotkowski, North Vancouver (CA); Gregory Bernhard Sheehan, Delta (CA)

(73) Assignee: Light-Based Technologies Incorporated, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/706,104

(22) Filed: Dec. 5, 2012

(65) Prior Publication Data
US 2013/0093345 A1 Apr. 18, 2013

Related U.S. Application Data

(63) Continuation of application No. 13/481,898, filed on May 28, 2012, now Pat. No. 8,344,630, which is a continuation of application No. 12/912,576, filed on Oct. 26, 2010, now Pat. No. 8,203,277.

(60) Provisional application No. 61/279,750, filed on Oct. 26, 2009, provisional application No. 61/395,589, filed on May 17, 2010, provisional application No. 61/363,161, filed on Jul. 9, 2010.

(51) Int. Cl.
*H05B 37/02* (2006.01)

(52) U.S. Cl.
USPC .......................... 315/155; 315/246; 315/291

(58) Field of Classification Search
USPC ............. 315/149, 155, 158, 194, 209 R, 246, 315/291, 307, 308, 360
See application file for complete search history.

(56) References Cited

U.S. PATENT DOCUMENTS

| | | | |
|---|---|---|---|
| 4,079,272 | A | 3/1978 | Howatt |
| 4,825,351 | A | 4/1989 | Uesugi |
| 5,077,486 | A | 12/1991 | Marson et al. |
| 5,471,132 | A | 11/1995 | Ryat |
| 5,745,351 | A | 4/1998 | Taurand |
| 5,768,118 | A | 6/1998 | Faulk et al. |

(Continued)

FOREIGN PATENT DOCUMENTS

| | | |
|---|---|---|
| GB | 2111258 A | 6/1983 |
| WO | 9818199 A1 | 4/1998 |

(Continued)

*Primary Examiner* — Thuy Vinh Tran
(74) *Attorney, Agent, or Firm* — Oyen Wiggs Green & Mutala LLP

(57) ABSTRACT

Solid state light sources are compatible with AC phase-cut dimmers. The light sources may have switching mode power supplies having primary and secondary sides that are in first and second circuit parts that are electrically isolated from one another. Information regarding a waveform of input electrical power is extracted in the first circuit part and passed to a controller in the second circuit part by way of a galvanic isolator. Additional isolated paths may be provided to provide bi-directional exchange of information between the first and second circuit parts and/or to provide for the exchange of additional information relevant to control. The signal path from the first side to the second side may have a low latency.

27 Claims, 6 Drawing Sheets

(56) References Cited

U.S. PATENT DOCUMENTS

| | | |
|---|---|---|
| 6,084,784 A | 7/2000 | Durbaum |
| 6,333,862 B1 | 12/2001 | Lee et al. |
| 6,486,616 B1 | 11/2002 | Liu et al. |
| 6,713,974 B2 | 3/2004 | Patchornik et al. |
| 6,807,075 B2 | 10/2004 | Miermans |
| 6,813,170 B2 | 11/2004 | Yang |
| 6,850,048 B2 * | 2/2005 | Orr et al. ............. 323/299 |
| 6,909,672 B2 | 6/2005 | Rao |
| 7,038,399 B2 | 5/2006 | Lys et al. |
| 7,317,625 B2 | 1/2008 | Zhang et al. |
| 7,352,138 B2 | 4/2008 | Lys et al. |
| 7,375,990 B2 | 5/2008 | Muramatsu |
| 7,408,392 B2 | 8/2008 | Ivanov |
| 7,616,455 B2 | 11/2009 | Cameron et al. |
| 7,710,054 B2 | 5/2010 | Alberkrack et al. |
| 7,859,194 B2 * | 12/2010 | Walker et al. ............. 315/209 R |
| 8,023,290 B2 | 9/2011 | Schlecht |
| 2002/0130636 A1 | 9/2002 | Yokokura et al. |
| 2003/0030422 A1 | 2/2003 | Sula |
| 2004/0032754 A1 | 2/2004 | Yang |
| 2008/0224636 A1 | 9/2008 | Melanson |
| 2008/0304299 A1 | 12/2008 | Bormann |
| 2009/0243582 A1 | 10/2009 | Irissou et al. |
| 2010/0135049 A1 | 6/2010 | Radecker et al. |

FOREIGN PATENT DOCUMENTS

| | | |
|---|---|---|
| WO | 2007026170 A2 | 3/2007 |
| WO | 2007109001 A2 | 9/2007 |
| WO | 2010005291 A1 | 1/2010 |

* cited by examiner

EFFICIENT ELECTRICALLY-ISOLATED POWER CIRCUITS WITH APPLICATION TO LIGHT SOURCES

CROSS REFERENCE TO RELATED APPLICATIONS

This application is a continuation of U.S. patent application Ser. No. 13/481898 filed 28 May 2012, now U.S. Pat. No. 8,344,630, which is a continuation of U.S. patent application Ser. No. 12/912576 filed 26 Oct. 2010, now U.S. Pat. No. 8,203,277, which claims the benefit under 35 U.S.C. §119 of the following United States patent applications, all of which are hereby incorporated herein by reference: Application No. 61/279750 filed 26 Oct. 2009; Application No. 61/395589filed 17 May 2010; and, Application No. 61/363,161 filed 9 Jul. 2010.

TECHNICAL FIELD

The invention relates to lighting. Some embodiments provide efficient LED light systems that may be controlled using AC phase-cut dimmers.

BACKGROUND

Conventional lighting such as incandescent lamps and fluorescent lamps are relatively inefficient. A significant proportion of the electrical power supplied to conventional lighting fixtures is converted into heat instead of light.

Solid-state light sources such as light-emitting diodes ('LEDs') can convert electrical energy into light much more efficiently than incandescent or fluorescent bulbs. LEDs having high power and reliability suitable for use in architectural lighting applications are now available.

There is a general desire for light sources that can be dimmed. Many buildings are wired with AC phase-cut dimmers. Such dimmers are capable of dimming incandescent lamps by reducing the power delivered to the lamps. This is done by cutting off a portion of the AC waveform. Most solid-state lighting circuits are not well suited to being controlled by AC phase cut dimmers. While solid-state lighting systems can be designed to work with different control technologies, there is a very large installed base of AC phase cut dimmers. There is a need for more-efficient solid-state lighting systems that can be dimmed by AC phase-cut dimmers.

Solid state lighting systems have the advantage of improved energy efficiency. Further, a solid-state lighting system may be designed to provide control over power factor.

Solid state lighting systems have the additional advantage that the light emitters are powered at low voltages. Low voltage electrical power is safe. Low-voltage components do not require the same safety certifications that are required for lighting systems that use higher voltages such as the 110 volts or higher AC voltages typically used in North America to power incandescent and fluorescent lights. There remains a need for solid-state lighting systems that can be powered by higher AC voltages (such as household AC current) while ensuring the safety of users.

SUMMARY OF THE INVENTION

One aspect of the invention provides solid-state light sources. The light sources comprise a power input; a rectifier connected to rectify an AC waveform presented at the power input; and a switching mode power supply having a primary side and a secondary side. The secondary side is electrically isolated from the primary side. In this disclosure, the terms "electrically isolated" and "galvanically isolated" when applied to two components, terminals, circuit parts or the like mean that there is no conduction path by which electrons can flow directly between the components, terminals, circuit parts or the like.

The primary side is connected to receive electrical power rectified by the rectifier. A solid-state light emitter (for example, a LED, OLED, or the like) is connected to receive electrical power from the secondary side of the switching mode power supply. A control is connected to control a current being drawn by the solid-state light emitter. The control is connected to receive a signal from a monitoring circuit. The signal may, for example, comprise a DC voltage or current, an AC voltage or current, a series of pulses or another information-carrying signal. The monitoring circuit is connected to receive an output of the rectifier and is configured to generate a signal indicative of at least one characteristic of the output of the rectifier. The light sources comprise a galvanic isolator connected to carry the signal from the monitoring circuit to the control.

With this construction all of the secondary side of the switching mode power supply, the control and the solid-state light emitter can be galvanically isolated from the monitoring circuit and the primary side of the switching mode power supply.

Further aspects of the invention and features of specific embodiments of the invention are described below.

BRIEF DESCRIPTION OF THE DRAWINGS

The accompanying drawings illustrate non-limiting example embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
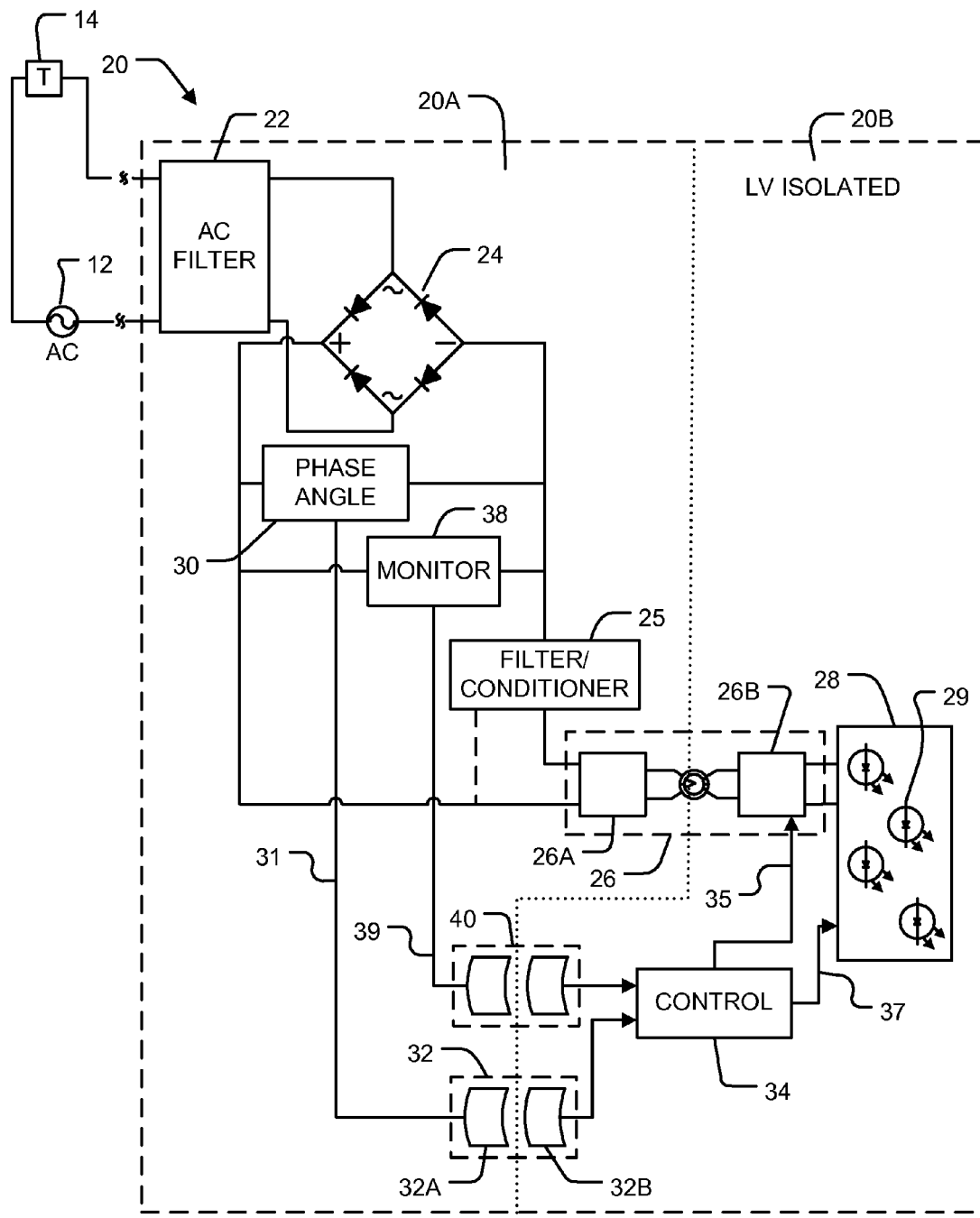
FIG. 1 is a schematic block diagram showing a light source according to an example embodiment of the invention.

FIG. 1 shows a light source 20. Light source 20 is driven by electrical power supplied by an AC supply 12. For example, the AC supply 12 may comprise a supply of standard household AC current. AC supply may have a voltage in excess of 100 volts. For example, AC supply 12 may supply electrical current at a voltage of 120 volts, 240 volts, 277 volts, 575 volts or some other suitable voltage.

Figure 1A:
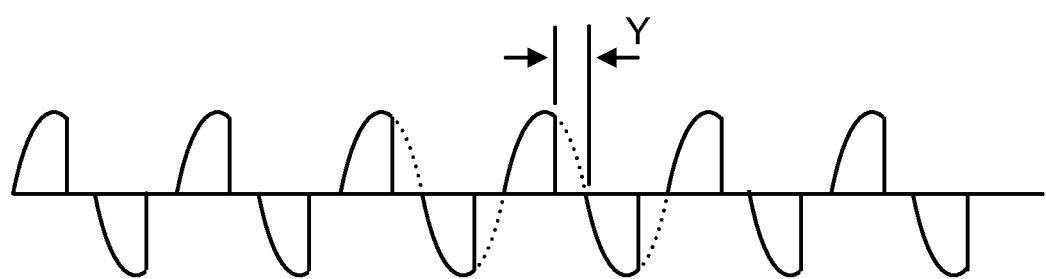
FIG. 1A illustrates a measurement of the phase angle.

A phase-cut dimmer 14 is provided in the circuit to which light source 20 is connected. Dimmer 14 truncates a variable amount Y from each half-cycle of the AC waveform as shown in FIG. 1A. Depending upon its construction, dimmer 14 may cut the leading or trailing edges of the AC waveform.

Light source 20 comprises an AC filter 22. AC filter 22 is configured to remove high-frequency electrical noise from the incoming AC power.

The filtered AC power is rectified by rectifier 24. Rectifier 24 is illustrated as being a full-wave bridge but may have other suitable configurations. It is generally desirable that rectifier 24 provide full-wave rectification although this is not mandatory in all embodiments.

The output from rectifier 24 is connected to power a switching mode power supply ('SMPS') 26. SMPS 26 comprises a primary side 26A and a secondary side 26B. Primary side 26A and secondary side 26B are electrically isolated from one another. That is, there is no path by which electrons can flow directly from the inputs of primary side 26A to the outputs of secondary side 26B. Primary side 26A and secondary side 26B are characterized by different ground potentials in preferred embodiments.

Power filtering and conditioning are optionally provided by filter/conditioner 25. Filter/conditioner 25 may, for example, comprise further filters, capacitors, regulators which take the rectified power from rectifier 24 and provide DC power to SMPS 26.

Outputs of SMPS 26 are connected to supply electrical current at an appropriate voltage to a solid-state light emitter 28. Solid-state light emitter 28 may, for example, comprise an LED light emitter comprising one or more LEDs 29. In some embodiments, light emitter 28 comprises a plurality of LEDs 29 and a switching matrix (not shown in FIG. 1) that permits the LEDs 29 to be interconnected in various ways. The switching matrix may, for example, be operative to vary the number of LEDs that are connected to emit light at a given time.

In the illustrated embodiment, light source 20 comprises one or more circuits for monitoring characteristics of the AC waveform being delivered to light source 20. FIG. 1 shows a phase angle detector 30 that extracts from the rectified AC signal a characteristic that indicates the phase angle (e.g. measure of the parameter Y indicated in FIG. 1A) at which dimmer 14 is currently cutting off the leading and/or trailing edges of each half-cycle of the AC waveform being provided to light source 20. A signal 31 is carried from phase angle detector 30 to a controller 34 by way of an isolator 32 comprising galvanically isolated first and second sides 32A and 32B.

One or more additional or alternative monitoring circuits 38 may be provided to monitor other aspects of the AC waveform being delivered to light source 20. Monitoring circuit 38 may, for example, monitor one or more of: RMS voltage; RMS power; peak voltage; the timing of AC half-cycles; the phase shift between peak voltage and peak current (e.g. a measure of power factor); the envelope of the AC waveform; or the like. Circuit 38 generates a signal 39 that is carried to controller 34 by way of isolator 40.

Controller 34 controls one or more of secondary side 26B of SMPS 26 and solid-state light source 28 based at least in part on signals received from circuits 30 and/or 38. In the embodiment illustrated in FIG. 1, controller 35 provides control inputs 35 to secondary side 26B and control inputs 37 to solid-state light source 28.

From the foregoing description it can be seen that light source 20 comprises a first part 20A in which line voltages may be present and a second part 20B that is galvanically isolated from first part 20A. Advantageously, all parts of light source 20 that are accessible to a user may belong to second part 20B. First part 20A and second part 20B may have different ground potentials. Another advantage of the light source illustrated in FIG. 1 is that control 34 is isolated from the electrical environment of first part 20A, which may be electrically noisy, by isolators 32 and 40 and the electrical isolation provided between primary and secondary parts 26A and 26B of SMPS 26. This can be beneficial especially in cases where control 34 is of a type that is susceptible to being damaged or being caused to operate improperly by electrical noise.

Figure 2:
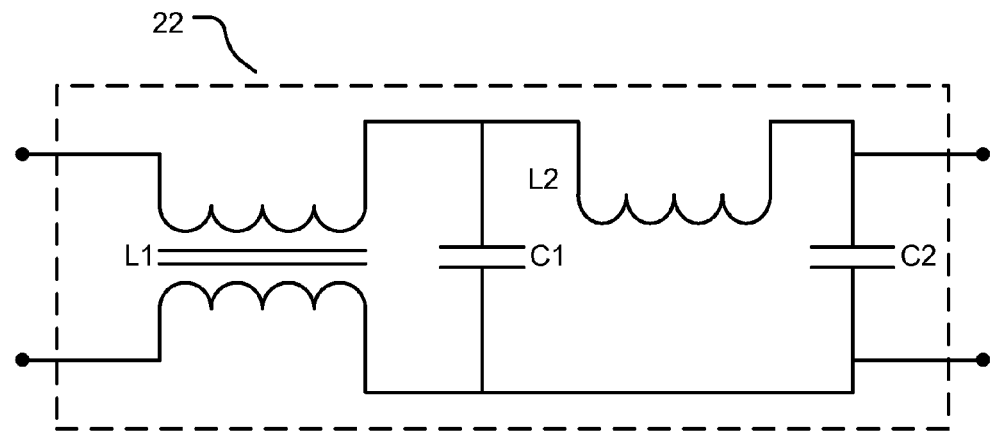
FIG. 2 is a schematic diagram illustrating an example AC filter of a type that may be used in the light source of FIG. 1.

FIG. 2 shows one possible example circuit that may be used as an AC filter 22 in an embodiment like that of FIG. 1. A wide range of other filter arrangements may be used for filter 22. Filter 22 as shown in FIG. 2 comprises a first inductor L1, a second inductor L2 and capacitors C1 and C2. In a non-limiting example embodiment, these components have the values: L1=470 μH, L2=150 μH, and C1=C2=15 nF. Any high frequency electrical noise present in the AC signal at the input of light source 20 is blocked by L1 and L2 and shunted by C1 and C2.

Figure 3A:
FIG. 3A illustrates the waveform of the sample circuit.
Figure 3:
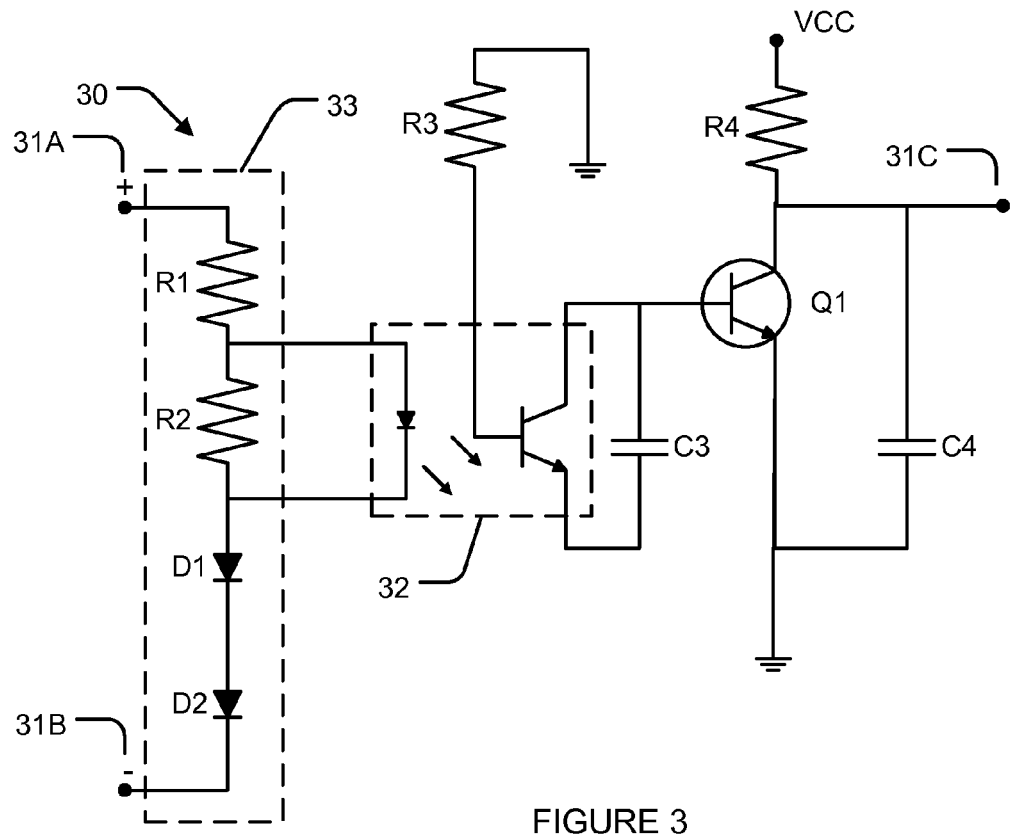
FIG. 3 is a schematic diagram illustrating an example circuit that may be used for extracting and carrying phase angle information to an isolated secondary side of a lighting system.

FIG. 3 shows an example circuit that may be used as a phase angle detector in a light source like that shown in FIG. 1. Circuit 30 may be connected directly to the output of rectifier 24. The waveform across the positive and negative inputs 31A and 31B of circuit 30 may, for example, be as shown in FIG. 3A. The series connected circuit 33 made up of R1, R2 D1 and D2 serves as a voltage-to-current converter. The current through circuit 33 varies as the voltage across inputs 31A and 31B. In a non-limiting example embodiment, R1=39 kΩ, R2=3 kΩ, and D1 and D2 are type 1N4148 diodes which each provide a forward voltage drop of 1.0 volt.

The voltage dropped across R2 is applied to the inputs of optoisolator 32. By way of non-limiting example, optoisolator 32 may comprise a type CMY17-4 optoisolator as available from various manufacturers including Agilent Technologies, Inc. of Santa Clara Calif.

Suitable circuitry is provided to extract and pass on the signal that has passed through the optoisolator. In the illustrated embodiment, the output from optoisolator 32 is applied to the base of transistor Q1 which acts as an amplifier to produce a voltage signal at output 31C that carries information regarding the phase angle at which dimmer 14 is cutting off the waveform of the AC power being supplied to light source 20. In a non-limiting example embodiment, R3=81 kΩ, R4=5 kΩ, C3=C4=0.1 μF and Q1 is a type MJD 340TF NPN transistor available from various sources including Fairchild Semiconductor Corporation of San Jose, Calif.

Amplifying the output of isolator 32 is optional. Amplifying the output of isolator 32 can provide an output in the form of pulses that are more nearly rectangular than the pulses at the input of isolator 32. In some embodiments, analysis of the signal by control 34 is facilitated by having larger-amplitude, more nearly rectangular, pulses. In some embodiments the signal received at the output of optoisolator 32 is processed using logic circuits, such as a logic inverter circuit that provide a logic level output signal.

Optionally circuitry that receives the output from optoisolator 32 comprises a filter configured to remove or attenuate electrical noise that may be present in the received signal.

Control 34 may take any of a variety of forms. By way of example, control 34 may comprise a programmed data processor, analog circuitry, combinations thereof, or the like. In preferred embodiments, control 34 controls the magnitude of a continuous DC electrical current delivered to drive light-emitters 29. Such DC control is in contrast to the pulse-width modulation (PWM) control often applied to dim LEDs.

Where control 34 comprises a data processor, the signal received from isolator 32 may be processed to determine a desired dimming level and an output signal may be determined for the dimming level by performing a calculation based on the dimming level and stored parameters relating to the performance of light emitters 29, looking up an output signal in a lookup table, or the like. Optionally, the signal from isolator 32 is subjected to analog domain processing before it is provided to control 34. For example the signal received at isolator 32 may be modified according to a response curve having a specific weighting desirable for operation of LEDs.

Figure 4:
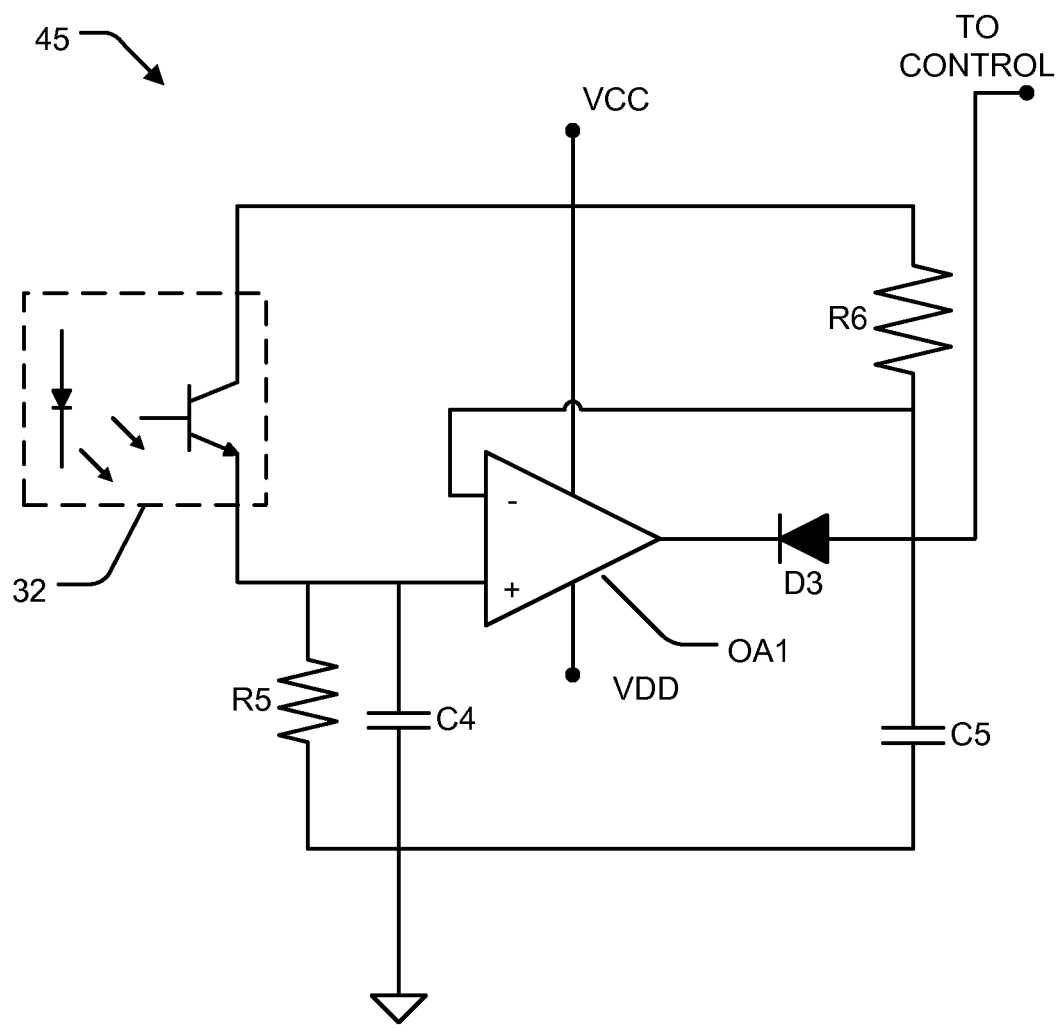
FIG. 4 is a schematic diagram illustrating an optional circuit for applying a non-linear transformation to a signal carried by an isolator.

FIG. 4 shows an example circuit 45. Circuit 45 transforms the output from isolator 32 to provide a DC output voltage which is related exponentially to the input signal (e.g. to the parameter Y illustrated in FIG. 1A). Circuit 45 includes an operational amplifier OA1 having a diode D3 connected in a feedback path. The functional relationship between the input signal and output is determined primarily by the electrical properties of D3. These properties and the use of diodes in feedback loops are known to those in the art. The output of circuit 45 may be provided to a further control 34 or may, in the alternative, be applied directly to control current through one or more solid-state light emitters (such as LEDs).

If desired, circuits may be provided to apply offset, switch polarity, amplify or level-shift the signal 31 received through isolator 32.

It is not mandatory that isolator 32 be an opto-isolator. Other forms of galvanic isolation may be used for isolator 32. By way of non-limiting example, isolator 32 may comprise: a transformer, a capacitor, a digital isolator, a magneto-isolator, an isolation amplifier, a signal transfer device having a transmitter and receiver that are electrically isolated from one another and exchange signals such as optical, radio, or ultrasound signals or the like. In some cases isolator 32 may comprise additional circuitry to convert signal 31 into a form suitable for passing through isolator 32. Isolator 32 may provide substantial electrical and electrical-grounding separation, typically at least 1000 volts breakthrough threshold.

Figure 5:
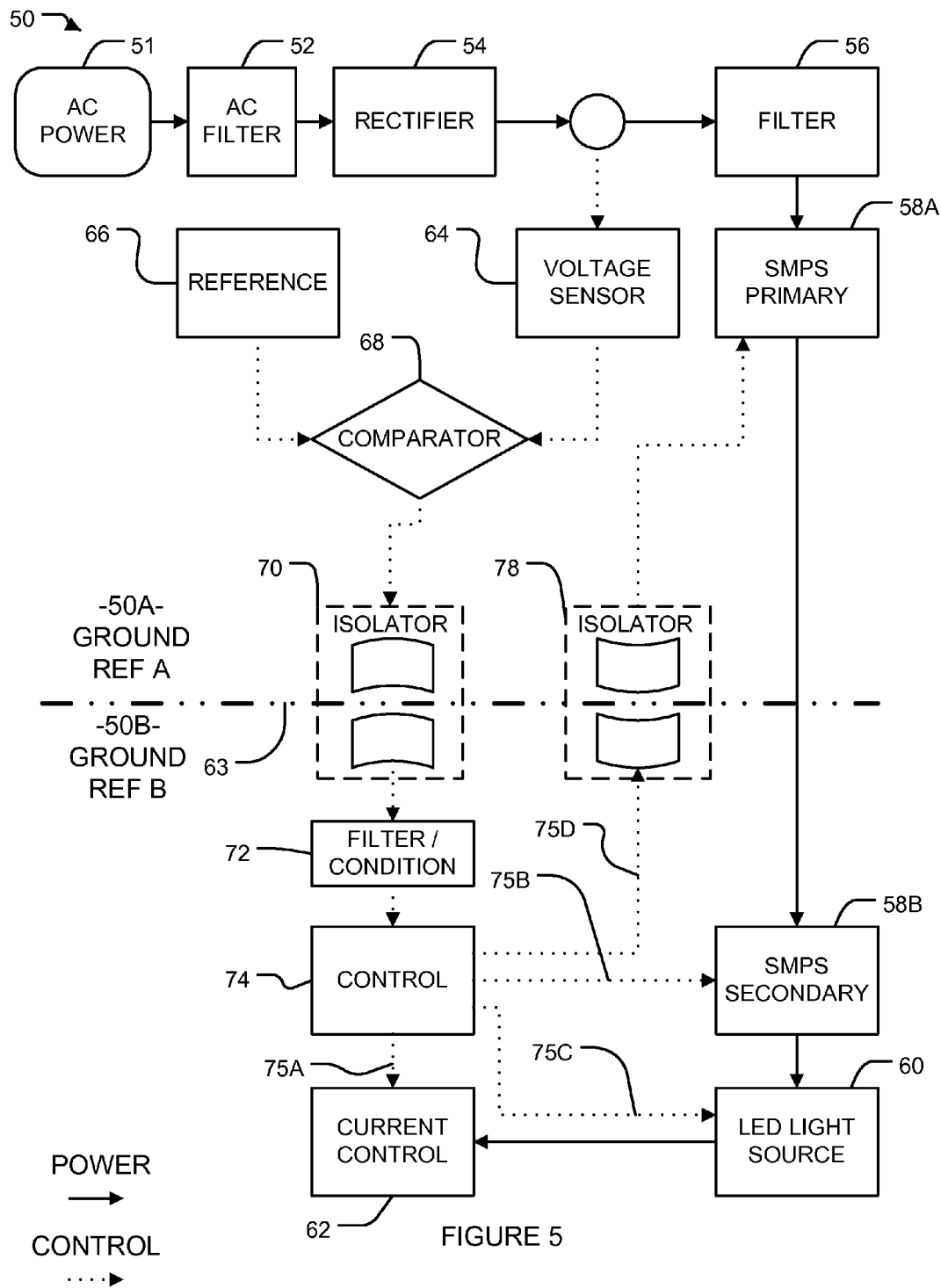
FIG. 5 is a block diagram illustrating a light source according to an alternative embodiment of the invention.

FIG. 5 is a block diagram of apparatus 50 according to another example embodiment. Apparatus 50 receives AC power 51. The AC power may optionally have passed through an AC phase-cut dimmer as described above. In FIG. 5, the flow of electrical power is indicated by solid lines while the flow of control signals and information used for control is indicated by dashed lines.

Incoming AC power 51 optionally passes through an AC filter 52 that is configured to remove undesired electrical noise. Filter 52 may, for example, comprise a low-pass filter. The filtered power is rectified at rectifier 54 which may comprise a full-wave rectifier such as a full-wave bridge, a half bridge or the like.

The rectified power is smoothed by an additional filter 56 and supplied to the primary side 58A of a SMPS. Power is transferred to secondary side 58B of the SMPS which supplies electrical current to drive a LED light source 60. Current through LED light source 60 is controlled by a current control 62.

Apparatus 50 can be seen to have two electrically isolated parts 50A and 50B respectively above and below the horizontal line 63. These parts are electrically isolated from one another and have different ground references.

The dimming signal applied by any upstream phase-cut dimmer is taken off at the output of rectifier 54 by a voltage sensor 64 which may comprise a voltage-to-current converter. One such voltage sensor arrangement is illustrated in FIG. 3. The sensed voltage is compared to a reference value 66 by a differential comparator 68. The output of differential comparator 68 passes from part 50A to part 50B through isolator 70.

The signal is filtered and/or conditioned by suitable circuits 72 and passed to control 74. In the illustrated embodiment, control 74 generates a signal 75A connected to control current control 62, a signal 75B connected to control secondary side 58B of the SMPS and a signal 75C connected to control LED light source 60.

One or more additional signals are optionally provided to controller 74. Such signals, if present, are carried from part 50A to part 50B by way of additional isolators (not shown in FIG. 5). Such signals may carry additional information regarding the waveform of AC power 51 for example.

FIG. 5 also shows that signal paths may be provided to carry signals from part 50B back to part 50A. In the illustrated embodiment, control 74 generates a signal 75D which controls an aspect of the operation of SMPS primary side 58A. Signal 75D passes from second side 50B to first side 50A by way of isolator 78. Control 74 may generate signal 75D, for example, based on information regarding the operational conditions of one or more of current control 62, light source 60 and SMPS secondary 58B and/or information received in one or more signals from part 50A. This architecture can therefore provide an electrically isolated bi-directional flow of power supply measurement, performance and control data from both primary to secondary side, and also secondary to primary side.

A wide range of control schemes may be implemented by control 74. In a simple case, control 74 receives a first signal indicative of a phase angle of a phase-cut AC waveform and, based on the first signal, generates a second signal that controls the magnitude of a DC current through one or more LED light emitters. In some embodiments generating the second signal comprises looking up a value of the first signal in a lookup table or calculating a function of the value of the first signal. The second signal may be related to the first signal in a non-linear manner.

Where the first signal comprises pulses and the phase angle is indicated by the duty cycle of the pulses then control 74 may determine the duty cycle of incoming pulses by a method comprising: detecting edges of the pulses; calculating the pulse length from difference in time between leading and trailing edges; calculating the cycle length from the difference in time between consecutive leading or trailing edges; and calculating the duty cycle as a ratio of the pulse length to the cycle length. The duty cycle may, for example, be expressed as a percentage. Control of the light emitter may be done based on the duty cycle. This method has the advantage of being independent of the frequency of the AC input signal and will work equally well, for example on 50 Hz or 60 Hz AC input. The duty cycle may be mapped to a control output by a suitable function (such as a linear or exponential function).

Advantageously the phase angle signal is communicated to control 74 with very little delay. In the illustrated embodiment, low delay results in part from the phase angle signal being directly generated by the operation of an analog circuit. The phase angle signal is generated in real time and changes in the phase angle are immediately represented in the phase angle signal. In the illustrated embodiment, the phase angle signal is directly generated without a separate encoding step, (for example a step of converting to a series of numbers and then transmitting the numbers as digital signals).

Low delay facilitates control of the SMPS to achieve optimal efficiency and/or power factor. For example, the expected power draw from the SMPS may be determined from the phase angle signal and the SMPS controlled to make the expected power available. Phase angle and/or other characteristics of the input waveform may be monitored and used as a basis for control of the SMPS primary and/or secondary. In some embodiments the SMPS comprises separate, isolated and synchronized controllers for the SMPS primary side and the SMPS secondary side. Such controllers may be configured to maximize power supply performance pertaining to both power factor and efficiency based upon a bi-directional flow of information that maintains electrical isolation between the SMPS primary side and the SMPS secondary side.

Where the brightness of light source 20 or 50 is being controlled in response to the phase angle signal, it may be desirable to apply a smoothing process to prevent large sudden changes in the brightness of the light source. Unlike incandescent devices, LEDs have no thermal inertia, an abrupt change in driving an LED results in an abrupt change in the LEDs light output which may be undesirable. Further, some triac phase cut dimmers do not act symmetrically on an AC signal. This can result in the phase angle signal varying at, for example, 60 Hz. If control 74 makes the control of the light emitters track the phase angle signal then the result may be a flicker in the light delivered.

One approach to preventing sudden changes in light output is to control the output based on a running average of the phase angle signal. For example, the control 74 may be configured to monitor the phase angle signal frequently (for example for each cycle or half-cycle of the AC waveform) and to take a running average of some number of samples (for example four samples). In an example embodiment, the duty cycle of the phase angle signal is determined and placed into a buffer in a FIFO fashion. The buffer holds N sequential duty cycle values. The contents of the buffer are summed and the signal applied to control the brightness of the light emitted by light source 20 is based on the sum.

The result is that any abrupt changes in the phase angle are smoothed. This smoothing also facilitates running the SMPS efficiently. The output of the SMPS may be controlled to match demand. Smoothing changes in the commanded brightness of the light emitters can provide time for the SMPS to ramp up to a higher-power mode. Some example methods and apparatus for controlling a power supply to supply an amount of power based upon a current demand are described in US 2008/0224636. Such methods and apparatus may optionally be integrated with the technology described herein. The rate at which light output is permitted to change may be selected to mimic response characteristics of incandescent lamps.

It is not mandatory to use a programmed processor to provide smoothing of changes in light output. Such smoothing may alternatively be achieved by providing suitable electronic hardware, such as an integrating amplifier, other suitable analog or mixed signal electronic hardware or the like.

In some embodiments a SMPS has a plurality of separate secondary sides that are electrically isolated from one another as well as being electrically isolated from a primary side of the SMPS. In some cases it may be desirable to provide the same signal (such as a phase angle signal) to controls associated with each of the secondary sides. In some embodiments this is achieved by communicating the same phase angle or other signal into a plurality of electrically isolated domains that are respectively associated with different SMPS secondary sides by way of separate isolators. For example, in a case where a SMPS has first, second and third secondary sides and a single primary side, a phase angle signal may be generated and passed through first, second and third isolators to controllers associated with the first, second and third secondary sides respectively.

Figure 6:
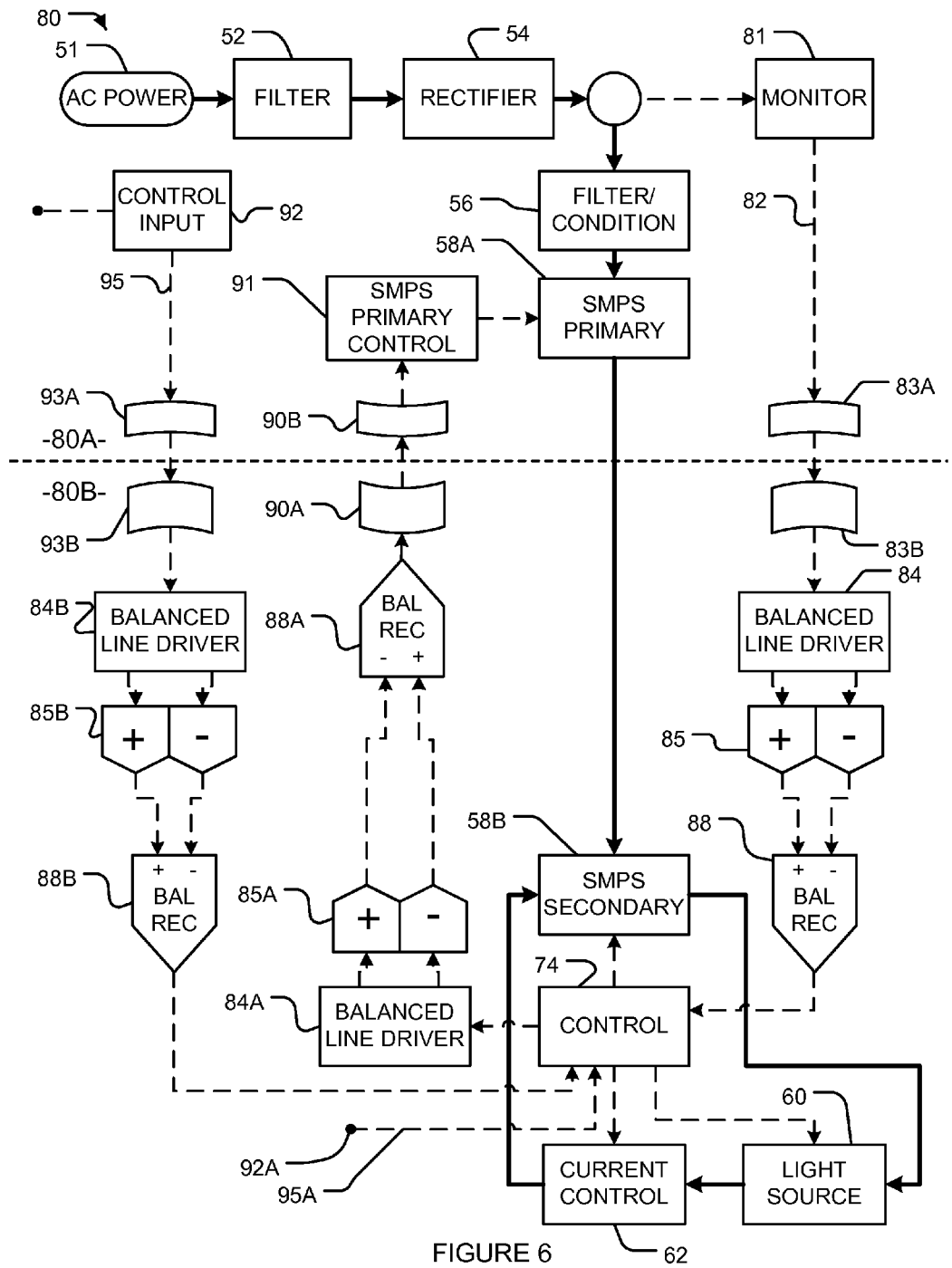
FIG. 6 is a block diagram illustrating a light source according to another alternative embodiment of the invention.

FIG. 6 is a block diagram of a light source 80 that illustrates additional features that may be present in apparatus according to some embodiments of the invention. These features may be combined into other embodiments (for example those described above). One such feature is the use of balanced lines to carry signals. A balanced line provides reduced sensitivity to electrical noise. In a balanced line, signals are represented as differences in values between two conductors. Induced potentials tend to affect both conductors equally and so are rejected.

Another such feature is that some embodiments may provide inputs for additional or alternative dimmer control inputs. For example, in some applications dimming control signals are provided by way of low-voltage wiring that is separate from power wiring. In an example embodiment, a dimmer signal is a DC voltage in the range of 0 to 10 volts or 1 to 10 volts. In such embodiments, one or more isolators may be provided to isolate the part of the circuit that includes the secondary side of the SMPS from the control wiring.

FIG. 6 shows a number of components that are also shown in FIG. 5 these are identified using the same reference numbers used in FIG. 5. FIG. 6 shows a monitoring circuit 81 that measures some characteristic of AC power 51. For example, monitoring circuit 81 may monitor a phase angle at which half-cycles of an AC waveform are cut by a phase cut dimmer, RMS voltage or power or some other feature of the AC power 51. Monitoring circuit 81 may optionally be configured to also monitor and extract some form of additional information that is embedded within or overlaid upon the incoming supply AC waveform. The additional information may, for example, signal demand rate change or some other property of AC power 51.

Monitoring circuit 81 generates a signal 82 that is passed through an isolator 83 comprising primary part 83A and secondary part 83B. Signal 82 may have any of a wide variety of forms. In some embodiments, signal 82 comprises a pulsed signal that recreates the waveform of AC power 51 after rectification, an AC signal that has a waveform like that of AC power 51, a signal having a DC value representing a value of the characteristic monitored by monitoring circuit 81 or the like.

Isolator 83 is of a type that can pass signal 82 and may include circuitry suitable for converting signal 82 into a form that can pass through the isolating medium of isolator 83.

A balanced line driver 84 is provided at the output on the secondary side of isolator 83. Balanced line driver 84 drives the two conductors of a balanced line 85 that carries signal 82 to a receiver 88. Receiver 88 extracts signal 82 from the balanced line and provides the signal 82 to controller 74.

Controller 74 is also connected to deliver a signal to a SMPS primary control 91 that controls SMPS primary 58A by way of a second balanced line comprising balanced line driver 84A, balanced line 85A and receiver 88A and a second isolator 90 comprising primary 90A and secondary 90B.

It can be seen that part 80B of light source 80 is galvanically isolated from part 80A. Isolators 83 and 90 and SMPS 58 all provide galvanic isolation between first part 80A and second part 80B.

In FIG. 6, light source 80 also has a separate control input 92 that may be connected to receive a separate control signal.

Control input 92 may, for example, be configured to receive a low voltage AC or DC analog control signal 95. In alternative embodiments, control input 92 may be configured to receive a digital control signal.

Control signal 95 is passed from part 80A to part 80B through isolator 93 comprising primary 93A and secondary 93B. In part 80B, signal 95 is carried by a balanced line transmission path comprising a balanced line driver 84B, balanced line 85B and receiver 88B. The control signal is delivered to controller 74.

In some cases it may be desirable to provide control signals to controller 74 from a source that is already isolated from AC power 51 and from other higher voltages. The control signal may be provided as a low voltage (e.g. 0-10V) signal or a digital signal such as a Digital Addressable Lighting Interface ("DALI") signal or the like. FIG. 6 shows an optional direct input 92A for carrying one or more additional control signals 95A to controller 74.

Controller 74 may control the brightness of light source 60 based on one or more of control signals 82 and 95 and 95A. Controller 74 may also control one or both of the primary and secondary sides of SMPS 58 to maintain high efficiency at a good power factor based on one or more signals received from part 80A of light source 80.

In embodiments to be used with triac phase cut dimmers (or other types of dimmer which require a holding current to be drawn) a holding current circuit (not shown) may be provided. In some embodiments the amount of current drawn by the holding current circuit may be controlled in response to the signal measured by monitoring circuit 81 such that holding current is only drawn when required by a dimmer and in an amount required for proper operation of the dimmer.

The embodiments described and illustrated herein are examples only. Features of these embodiments may be combined in other ways than those described explicitly herein to provide further embodiments. Furthermore, in some applications, certain features illustrated in the example embodiments described and illustrated herein may not be required and/or additional elements may be provided in certain embodiments in ways known to those of skill in the art in substitution for or in addition to illustrated features. For example, filters are illustrated at various points in the circuits may be replaced with other filter designs in other embodiments and may not be required at all in some embodiments.

Certain implementations of the invention comprise computer processors which execute software instructions which cause the processors to perform a method of the invention. For example, one or more processors in a control as described herein may implement methods ad described herein by executing software (including firmware) instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, non-transitory physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A power circuit comprising:
    a first part and a second part that are galvanically isolated from one another;
    a switching mode power supply having a primary side in the first part of the power circuit and a secondary side in the second part of the power circuit, the primary side connected to receive electrical power from a power input, the secondary side connectable to supply electrical power to drive a load comprising one or more solid-state light emitters;
    a primary side control in the first part of the power circuit, the primary side control connected to control operation of the primary side of the switching mode power supply;
    a control circuit in the second part of the power circuit, the control circuit configured to generate a primary side control signal for the primary side control;
    a first galvanic isolator configured to carry the primary side control signal from the control circuit to the primary side control;
    a monitoring circuit in the first part of the power circuit, the monitoring circuit configured to monitor one or more characteristics of the electrical power from the power input and to generate an information signal carrying information derived from the one or more monitored characteristics; and,
    a second galvanic isolator configured to carry the information signal from the monitoring circuit to the control circuit;
    wherein all of the secondary side of the switching mode power supply and the control circuit are galvanically isolated from the primary side of the switching mode power supply and the primary side control.

2. A power circuit according to claim 1 wherein:
    the secondary side of the switching mode power supply is one of a plurality of secondary sides of the switching mode power supply each of the plurality of secondary sides connected to provide electrical power to a corresponding load, each of the loads comprising a corresponding solid-state light source.

3. A power circuit according to claim 2 wherein the control circuit is one of a plurality of control circuits, each of the control circuits being associated with one of the secondary sides;
    each of the plurality of secondary sides of the switching mode power supply and its corresponding control circuit is in a separate second part of the power circuit; and,
    each of the separate second parts of the power circuit is galvanically isolated from the first part of the power circuit; and,
    the power circuit comprises, for each one of the secondary sides, a corresponding separate galvanic isolator configured to carry the information signal to the one of the control circuits associated with the secondary side.

4. A power circuit according to claim 3 wherein the plurality of separate second parts of the power circuit are electrically isolated from one another.

5. A power circuit according to claim 1 comprising a first balanced line transmission path connected to carry the primary side control signal from the control circuit to the first galvanic isolator, the first balanced line transmission path comprising a first balanced line driver, a first balanced line and a first receiver.

6. A power circuit according to claim 5 comprising a second balanced line transmission path connected to carry the information signal from the second galvanic isolator to the control circuit, the second balanced line transmission path comprising a second balanced line driver, a second balanced line and a second receiver.

7. A power circuit according to claim 1 comprising a control input in the first part of the power circuit, the control input separate from the power input, the control input connected to provide a control signal received at the control input to the control circuit by way of a third galvanic isolator.

8. A power circuit according to claim 7 comprising a third balanced line transmission path connected to carry the control signal from the third galvanic isolator to the control circuit, the third balanced line transmission path comprising a third balanced line driver, a third balanced line and a third receiver.

9. A power circuit according to claim 1 wherein the control circuit is connected to control operation of the secondary side of the switching mode power supply.

10. A power circuit according to claim 9 wherein the primary side control and control circuit are collectively configured to control power factor of the switching mode power supply based on the information signal.

11. A power circuit according to claim 1 wherein the control circuit is configured to generate the primary side control signal based on operational conditions of one or more of a current control, the load, and the secondary side of the switched mode power supply.

12. A power circuit according to claim 1 wherein the first and second parts of the power circuit have corresponding first and second ground references that are different from one another.

13. A power circuit according to claim 1 wherein the monitoring circuit is configured so that the information signal comprises pulses having a frequency at least equal to a frequency of an AC waveform of the input electrical power and the control circuit is configured to control the secondary side of the switching mode power supply and has a response time not exceeding a period of the pulses.

14. A power circuit according to claim 1 wherein the control circuit comprises a programmable data processor.

15. A method for controlling a power circuit comprising a switching mode power supply having a primary side connected to receive electrical power from a power input and a secondary side, wherein the primary side is in a first part of the power circuit, the secondary side is in a second part of the power circuit and the first part and second part of the power circuit are galvanically isolated from one another; the method comprising:
in the first part of the power circuit monitoring a characteristic of the electrical power and generating an information signal carrying information regarding the monitored characteristic of electrical power;
passing the information signal to a control circuit in the second part of the power circuit along a first path comprising a first galvanic isolator;
generating a primary side control signal at the control circuit based at least in part on the information signal;
passing the primary side control signal to a primary side control located in the first part of the power circuit and connected to control the primary side of the switched mode power supply along a second path comprising a second galvanic isolator; and,
operating the primary side control to control operation of the primary side based at least in part on the primary side control signal.

16. A method according to claim 15 comprising driving a light source comprising a solid state light emitter with electrical power output by the secondary side of the switched mode power supply.

17. A method according to claim 16 comprising controlling operation of the light source based at least in part on the information signal.

18. A method according to claim 17 wherein the information signal carries information specifying a phase angle of the input electrical power and the method comprises controlling an output of the light source based on a running average of the phase angle.

19. A method according to claim 17 comprising controlling a rate at which light output of the light source is permitted to change to have response characteristics typical of an incandescent lamp.

20. A method according to claim 16 wherein generating the primary side control signal is based on information regarding the operational conditions of a current control for controlling a current to the light source and the light source.

21. A method according to claim 15 comprising operating the primary side control and the control circuit to control power factor and efficiency of the switched mode power supply based upon a bi-directional flow of information between the first and second parts of the power circuit while maintaining electrical isolation between the first and second parts of the power circuit.

22. A method according to claim 15 wherein monitoring the characteristic of the electrical power comprises monitoring a phase angle of the electrical power.

23. A method according to claim 15 comprising maintaining a bi-directional flow of power 5 supply measurement, performance and control data between the first and second parts of the power circuit while maintaining electrical isolation between the first and second parts of the power circuit.

24. A method according to claim 15 wherein generating the information signal comprises generating pulses having a duty cycle related to a phase angle of the input electrical power.

25. A method according to claim 24 comprising, at the control circuit, detecting edges of the pulses; calculating a pulse length from the difference in time between leading and trailing edges of the pulses; calculating a cycle length from the difference in time between consecutive leading or trailing edges of the pulses; and calculating a duty cycle of the pulses as a ratio of the pulse length to the cycle length.

26. A method according to claim 15 comprising controlling both the primary side and the secondary side of the switched mode power supply based on the information signal.

27. A method according to claim 26 wherein the switching mode power supply comprises a plurality of secondary sides and the method comprises controlling each of the plurality of secondary sides based on the information signal.

* * * * *